US012056643B2

(12) United States Patent
Nayak et al.

(10) Patent No.: US 12,056,643 B2
(45) Date of Patent: Aug. 6, 2024

(54) SYSTEMS AND METHODS FOR RANKING RECOMMENDATIONS

(71) Applicant: Tyco Fire & Security GmbH, Neuhausen am Rheinfall (CH)

(72) Inventors: Rajesh Nayak, Vidyaratna Nagar Manipal (IN); Vineet Binodshanker Sinha, Brookfield, WI (US); Tulshiram Waghmare, Pune (IN)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 124 days.

(21) Appl. No.: 17/691,414

(22) Filed: Mar. 10, 2022

(65) Prior Publication Data

US 2022/0300871 A1  Sep. 22, 2022

(30) Foreign Application Priority Data

Mar. 19, 2021  (IN) .............................. 202121011779

(51) Int. Cl.
*G06Q 10/0633*  (2023.01)
(52) U.S. Cl.
CPC ................................ *G06Q 10/0633* (2013.01)
(58) Field of Classification Search
CPC ......................................... G06Q 10/00–50/00
USPC ................................................ 705/7.11–7.42
See application file for complete search history.

(56) References Cited

U.S. PATENT DOCUMENTS

| 6,993,403 | B1 * | 1/2006 | Dadebo | G05B 23/0294 |
| | | | | 702/182 |
| 9,842,298 | B1 * | 12/2017 | Wansley | G06Q 10/02 |
| 11,474,489 | B1 * | 10/2022 | Gibson | G05B 15/02 |
| 2010/0286937 | A1 * | 11/2010 | Hedley | G06Q 50/06 |
| | | | | 702/60 |
| 2012/0316934 | A1 * | 12/2012 | Zier | H04N 21/812 |
| | | | | 718/102 |
| 2014/0316582 | A1 * | 10/2014 | Berg-Sonne | G06Q 50/06 |
| | | | | 700/276 |
| 2015/0142789 | A1 * | 5/2015 | Parundekar | G06F 16/29 |
| | | | | 707/724 |
| 2016/0034459 | A1 * | 2/2016 | Larsen | G06F 16/487 |
| | | | | 707/740 |
| 2017/0316690 | A1 * | 11/2017 | Charles | H04W 4/023 |
| 2019/0340564 | A1 * | 11/2019 | Holmquist | G06Q 10/063116 |

(Continued)

*Primary Examiner* — Alan S Miller
(74) *Attorney, Agent, or Firm* — Foley & Lardner LLP

(57) ABSTRACT

A method of ranking recommendations, the method comprising receiving a recommendation to improve employee productivity, the recommendation including an indication of an equipment fault, retrieving context data associated with the equipment fault, the context data including at least three of: a fault priority associated with the equipment fault, a work order status for a work order associated with the equipment fault, a priority associated with at least one of (i) a piece of equipment, (ii) a space, or (iii) an individual associated with the equipment fault, a monetary value associated with the equipment fault, or a health parameter associated with the equipment fault, calculating a score for the recommendation based on the at least three of: the fault priority, the work order status, the priority, the monetary value, or the health parameter, and performing an action based on the score using at least one of the score or the recommendation.

19 Claims, 9 Drawing Sheets

(56) References Cited

U.S. PATENT DOCUMENTS

2020/0234220 A1* 7/2020 Ma .................... G08G 1/148
2021/0329081 A1* 10/2021 Singh .................. G06F 8/38

* cited by examiner

| Time | Expiration Time | Equipment | Space Name | Observations | Recommendations | Basis of Recommendation: | Accept/Reject |
|---|---|---|---|---|---|---|---|
| 28 June 2020 8:35AM CST | 1 Day | AHU 1 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 26 June 2020 8:36AM CST | 22 Days | AHU 3 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 27 June 2020 8:35AM CST | 11 Days | AHU 6 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 26 June 2020 8:44AM CST | 1 Day | AHU 2 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 24 June 2020 8:34AM CST | 2 Days | AHU 1 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 29 June 2020 8:35AM CST | No Expiration | AHU 1 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 11 August 2020 8:35AM CST | 1 Day | AHU 1 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |
| 26 June 2020 8:35AM CST | No Expiration | AHU 1 | 5755 S Green Bay Ave Corporate Center Building 1 > Floor 1 > NW Zone | Infection Risk could be lowered. | Adjust clean air delivery for NW Zone of Floor 1. | Higher fresh air flow lowers viral counts and lowers infection risk. | Accepted: Action Required See Details ✕ |

SYSTEMS AND METHODS FOR RANKING RECOMMENDATIONS

CROSS-REFERENCE TO RELATED PATENT APPLICATIONS

This application claims the benefit of and priority to Indian Provisional Patent Application No. 202121011779, filed Mar. 19, 2021, the entirety of which is incorporated by reference herein.

BACKGROUND

The present disclosure relates generally to building management systems (BMS), and more particularly to ranking recommendations generated by a BMS.

Building operators may use a graphical user interface to interact with a BMS. The graphical user interface may present recommendations to improve and/or modify various aspects of and/or associated with a building managed by the BMS. In various embodiments, there may be more recommendations generated by the BMS than can be efficiently managed by the building operator. Therefore, it may be difficult to prioritize which recommendations should be addressed and in which order the recommendations should be addressed.

SUMMARY

One implementation of the present disclosure is a method of ranking recommendations, the method comprising receiving a recommendation to improve space utilization of a space, retrieving context data associated with the space, the context data including (i) data describing previous user interest in other recommendations related to the recommendation and (ii) at least one of: data describing a current space utilization for the space, data describing a number of recommendations that are associated with the space, data describing environmental preferences of first individuals associated with the space or a building including the space, or data describing an organizational grouping of second individuals associated with the space or the building, calculating a score for the recommendation based on the data describing the previous user interest and the at least one of: the data describing the current space utilization, the data describing the number of recommendations, the data describing the environmental preferences, or the data describing the organizational grouping, and performing an action based on the score using at least one of the score or the recommendation.

In some embodiments, the method further comprises calculating a space utilization improvement potential based on the data describing the current space utilization. In some embodiments, the method further comprises calculating the score based on the data describing the current space utilization, the data describing the number of recommendations, the data describing the previous user interest, and the space utilization improvement potential. In some embodiments, performing the action includes displaying the recommendation to a user based on the score. In some embodiments, displaying the recommendation includes emphasizing the recommendation over other recommendations based on the score for the recommendation and other scores associated with each of the other recommendations. In some embodiments, emphasizing the recommendation includes displaying the recommendation higher in a list of recommendations. In some embodiments, retrieving the context data including the data describing the current space utilization includes retrieving a number of individuals using the space and a capacity for the space. In some embodiments, the method further comprises calculating, based on the number of individuals and the capacity, the current space utilization. In some embodiments, retrieving the data describing the previous user interest includes measuring a number of user interactions with the other recommendations and comparing the number of user interactions with a threshold.

Another embodiment of the present disclosure is a system for ranking recommendations, the system comprising one or more processors and one or more memories having instructions stored thereon that, when executed by the one or more processors, cause the one or more processors to receive a recommendation to improve space utilization of a space, retrieve context data associated with the space, the context data including (i) data describing previous user interest in other recommendations related to the recommendation and (ii) at least one of: data describing a current space utilization for the space, data describing a number of recommendations that are associated with the space, data describing environmental preferences of first individuals associated with the space or a building including the space, or data describing an organizational grouping of second individuals associated with the space or the building, calculate a score for the recommendation based on the data describing the previous user interest and the at least one of: the data describing the current space utilization, the data describing the number of recommendations, the data describing the environmental preferences, or the data describing the organizational grouping, and perform an action based on the score using at least one of the score or the recommendation.

In some embodiments, instructions further cause the one or more processors to calculate a space utilization improvement potential based on the data describing the current space utilization. In some embodiments, the instructions further cause the one or more processors to calculate the score based on the data describing the current space utilization, the data describing the number of recommendations, the data describing the previous user interest, and the space utilization improvement potential. In some embodiments, performing the action includes displaying the recommendation to a user based on the score. In some embodiments, displaying the recommendation includes emphasizing the recommendation over other recommendations based on the score for the recommendation and other scores associated with each of the other recommendations. In some embodiments, emphasizing the recommendation includes displaying the recommendation higher in a list of recommendations. In some embodiments, retrieving the context data including the data describing the current space utilization includes retrieving a number of individuals using the space and a capacity for the space. In some embodiments, the instructions further cause the one or more processors to calculate, based on the number of individuals and the capacity, the current space utilization. In some embodiments, retrieving the data describing the previous user interest includes measuring a number of user interactions with the other recommendations and comparing the number of user interactions with a threshold.

Another embodiment of the present disclosure is one or more non-transitory computer-readable storage media having instructions stored thereon that, when executed by one or more processors, cause the one or more processors to receive a recommendation to improve space utilization of a space, retrieve context data associated with the space, the context data including (i) data describing previous user interest in other recommendations related to the recommendation and (ii) at least one of: data describing a current space utilization for the space, data describing a number of recommendations that are associated with the space, data describing environmental preferences of first individuals associated with the space or a building including the space, or data describing an organizational grouping of second individuals associated with the space or the building, calculate a score for the recommendation based on the data describing the previous user interest and the at least one of: the data describing the current space utilization, the data describing the number of recommendations, the data describing the environmental preferences, or the data describing the organizational grouping, and perform an action based on the score using at least one of the score or the recommendation.

In some embodiments, performing the action includes emphasizing the recommendation over other recommendations by displaying the recommendation higher in a list of recommendations based on the score for the recommendation and other scores associated with each of the other recommendations.

Another embodiment of the present disclosure is a method of ranking recommendations, the method comprising receiving a recommendation to improve employee productivity, the recommendation including an indication of an equipment fault, retrieving context data associated with the equipment fault, the context data including at least three of: a fault priority associated with the equipment fault, a work order status for a work order associated with the equipment fault, a priority associated with at least one of (i) a piece of equipment, (ii) a space, or (iii) an individual associated with the equipment fault, a monetary value associated with the equipment fault, or a health parameter associated with the equipment fault, calculating a score for the recommendation based on the at least three of: the fault priority, the work order status, the priority, the monetary value, or the health parameter, and performing an action based on the score using at least one of the score or the recommendation.

In some embodiments, retrieving the context data includes retrieving data associated with a number of previous user interactions with recommendations relating to equipment of a same type as the piece of equipment. In some embodiments, updating the equipment priority based on the number of previous user interactions. In some embodiments, performing the action includes emphasizing the recommendation over other recommendations by displaying the recommendation higher in a list of recommendations based on the score for the recommendation and other scores associated with each of the other recommendations. In some embodiments, the context data further includes at least one of: an air quality metric associated with the equipment fault, or an energy usage metric associated with the equipment fault, and wherein the score is calculated based on at least one of: the air quality metric, or the energy usage metric. In some embodiments, the priority is a user defined priority corresponding to the at least one of: the piece of equipment, the space, or the individual. In some embodiments, retrieving the context data includes retrieving data describing a change to one or more environmental parameters of a space associated with the piece of equipment, and wherein the method further includes updating the priority based on the change. In some embodiments, the score is calculated based on the fault priority, the work order status, and the priority. In some embodiments, retrieving the context data includes retrieving an indication of whether the piece of equipment has a standby, and wherein the method further includes updating the priority based on the indication. In some embodiments, the equipment fault is a predicted equipment fault that has yet to occur.

Another embodiment of the present disclosure is a system for ranking recommendations, the system comprising one or more processors and one or more memories storing instructions thereon that, when executed by the one or more processors, cause the one or more processors to receive a recommendation to improve employee productivity, the recommendation including an indication of an equipment fault, retrieve context data associated with the equipment fault, the context data including at least three of: a fault priority associated with the equipment fault, a work order status for a work order associated with the equipment fault, a priority associated with at least one of (i) a piece of equipment, (ii) a space, or (iii) an individual associated with the equipment fault, a monetary value associated with the equipment fault, or a health parameter associated with the equipment fault, calculate a score for the recommendation based on the at least three of: the fault priority, the work order status, the priority, the monetary value, or the health parameter, and perform an action based on the score using at least one of the score or the recommendation.

In some embodiments, retrieving the context data includes retrieving data associated with a number of previous user interactions with recommendations relating to equipment of a same type as the piece of equipment. In some embodiments, the instructions further cause the one or more processors to update the equipment priority based on the number of previous user interactions. In some embodiments, performing the action includes emphasizing the recommendation over other recommendations by displaying the recommendation higher in a list of recommendations based on the score for the recommendation and other scores associated with each of the other recommendations. In some embodiments, the context data further includes at least one of: an air quality metric associated with the equipment fault, or an energy usage metric associated with the equipment fault, and wherein the score is calculated based on at least one of: the air quality metric, or the energy usage metric. In some embodiments, the priority is a user defined priority corresponding to the at least one of: the piece of equipment, the space, or the individual. In some embodiments, retrieving the context data includes retrieving data describing a change to one or more environmental parameters of a space associated with the piece of equipment, and wherein the instructions further cause the one or more processors to update the priority based on the change. In some embodiments, the score is calculated based on the fault priority, the work order status, and the priority. In some embodiments, retrieving the context data includes retrieving an indication of whether the piece of equipment has a standby, and wherein the instructions further cause the one or more processors to update the priority based on the indication. In some embodiments, the equipment fault is a predicted equipment fault that has yet to occur.

BRIEF DESCRIPTION OF THE DRAWINGS

FIG. 8 is a block diagram illustrating a user interface having ranked recommendations, according to some embodiments.

FIG. 9 is a block diagram illustrating another user interface having ranked recommendations, according to some embodiments.

DETAILED DESCRIPTION

Overview

Referring generally to the figures, systems and methods for ranking recommendations are disclosed herein. In various embodiments, recommendations are ranked according to various parameters such as fault priority, work order status, equipment priority, improvement potential, number of similar recommendations, user feedback, context data, and/or the like. In some embodiments, recommendations are ranked using an optimization algorithm. Additionally or alternatively, recommendations may be ranked using machine learning techniques such as reinforcement learning. It should be understood that, while the systems and methods of the present disclosure are discussed in relation to ranking recommendations, other elements may be ranked such as equipment faults, calendar notifications, reimbursement confirmations, work order requests, security notifications, and/or the like. The systems and methods disclosed herein may facilitate increased productivity, improved employee wellness, reduced energy costs, improved safety, and/or the like.

Building and HVAC Systems

Figure 1:
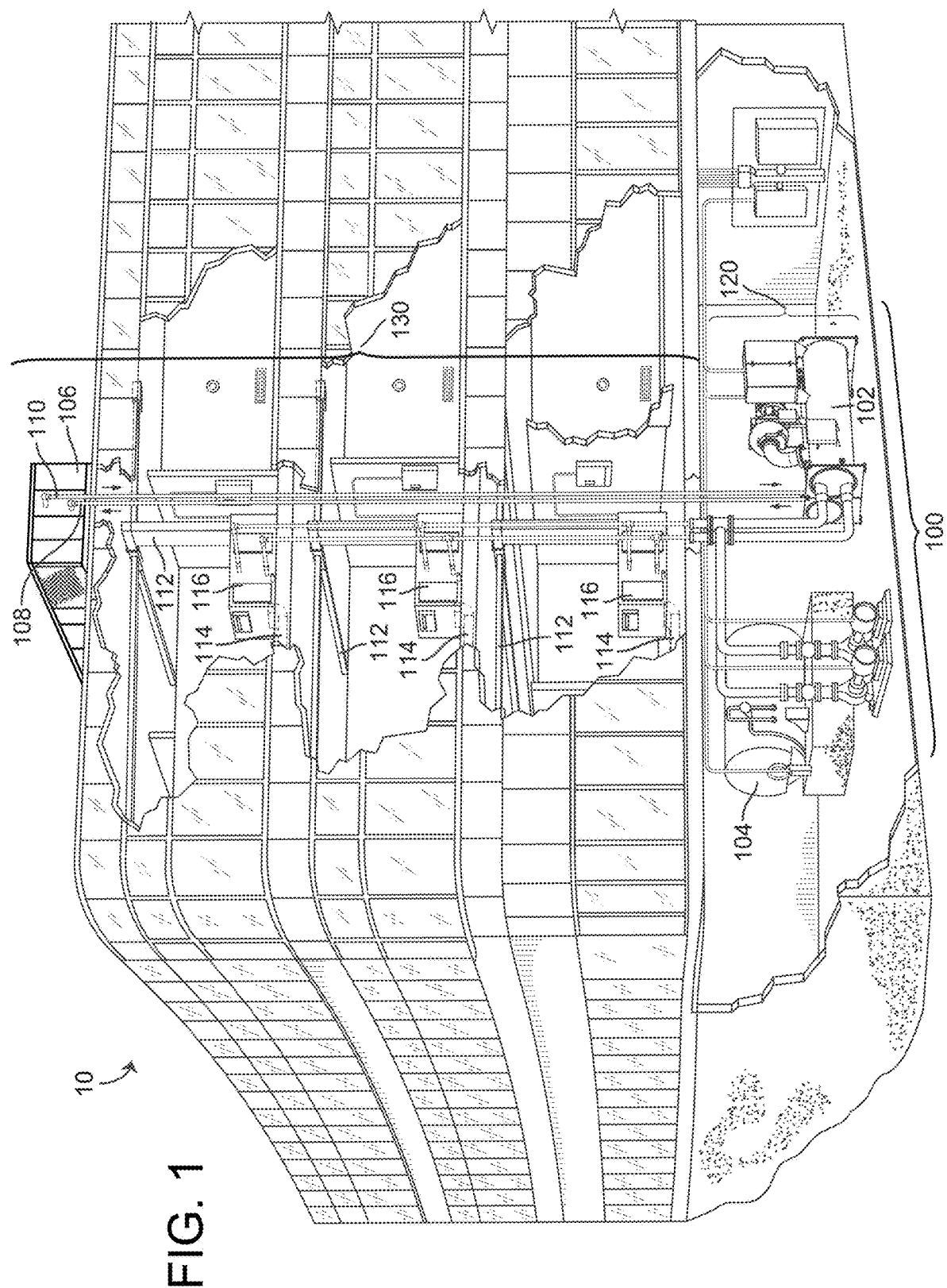
FIG. 1 is a perspective view of a smart building, according to some embodiments.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Figure 2:
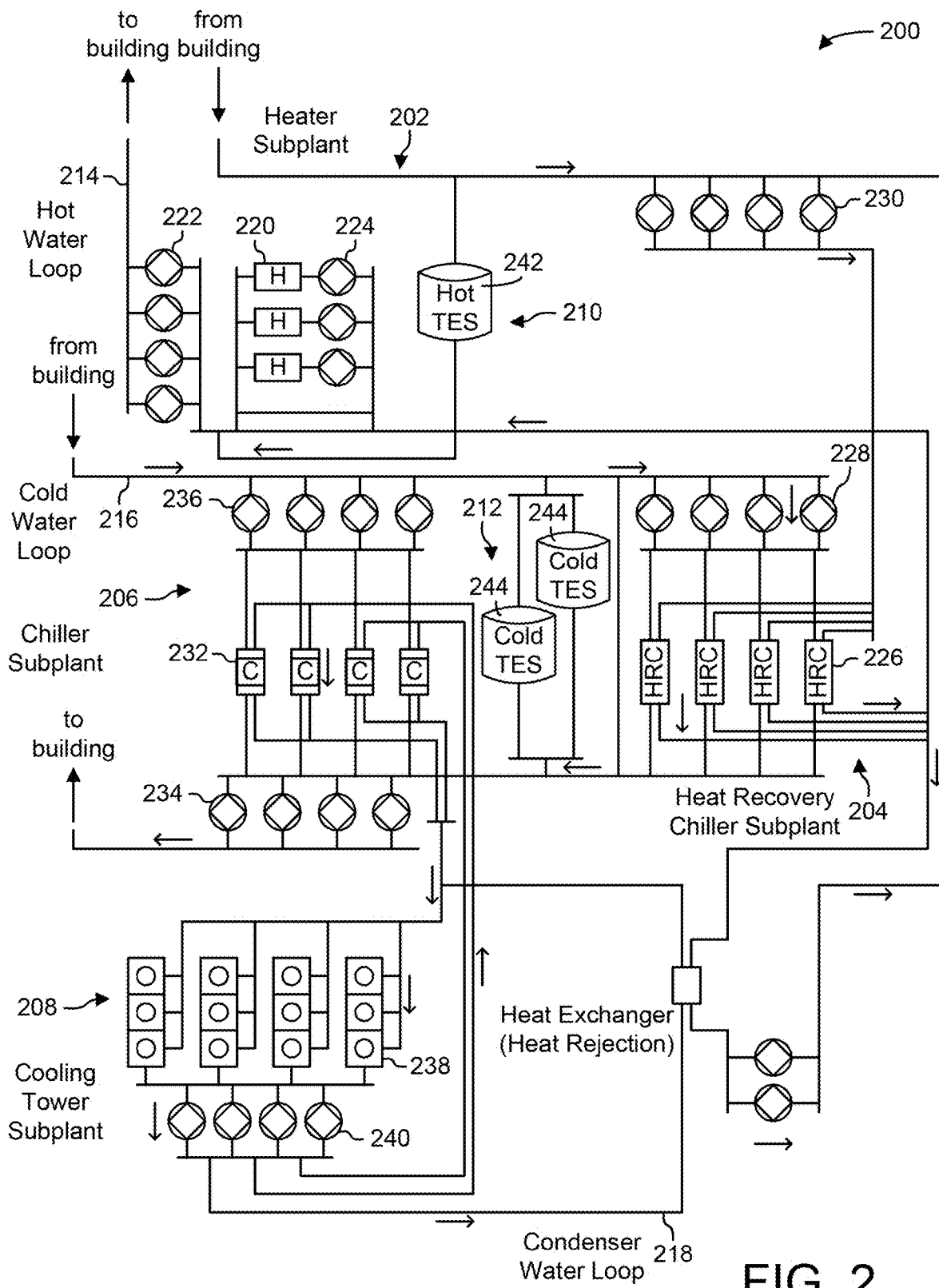
FIG. 2 is a block diagram of a waterside system, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Figure 3:
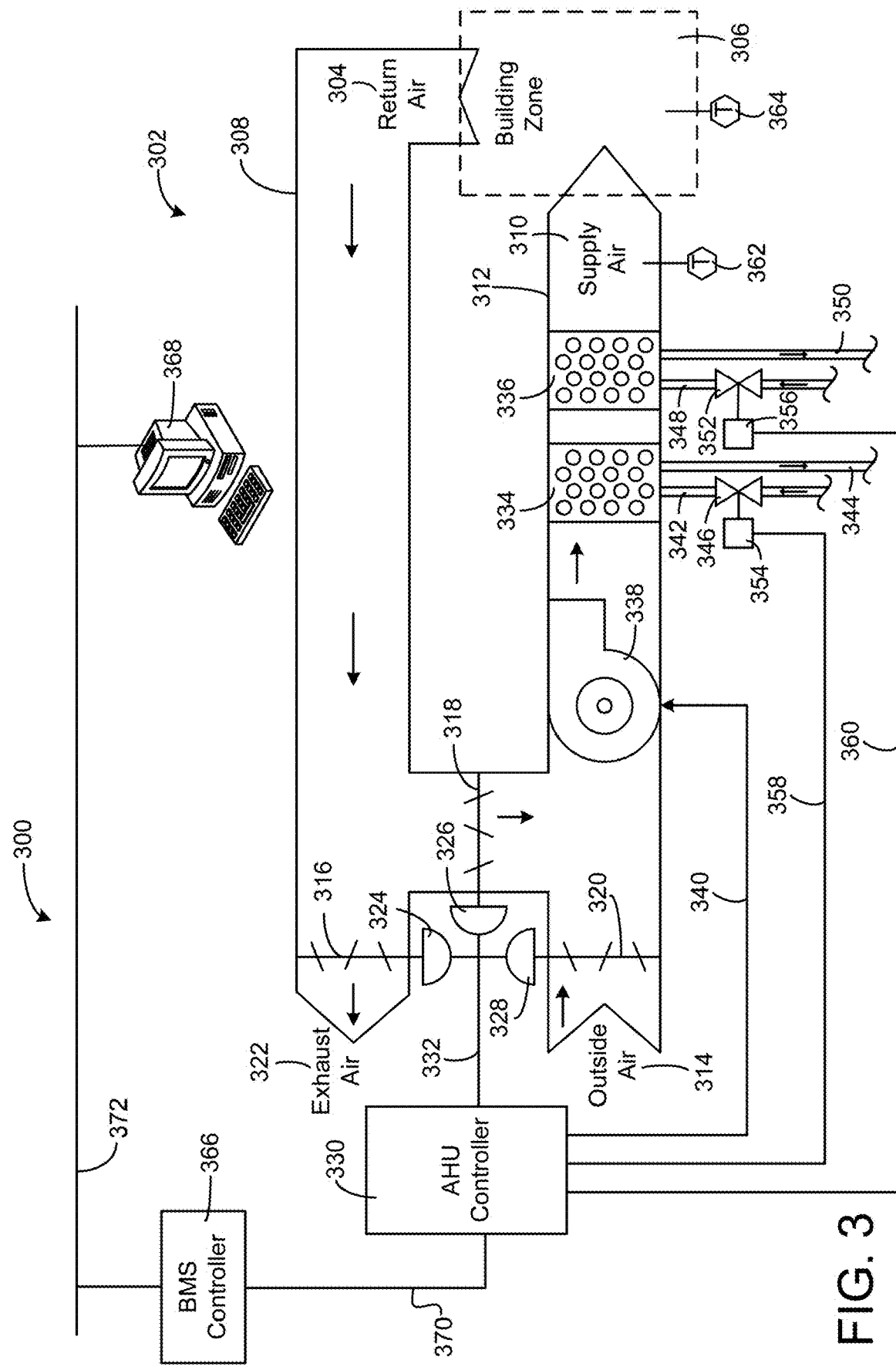
FIG. 3 is a block diagram of an airside system, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Figure 4:
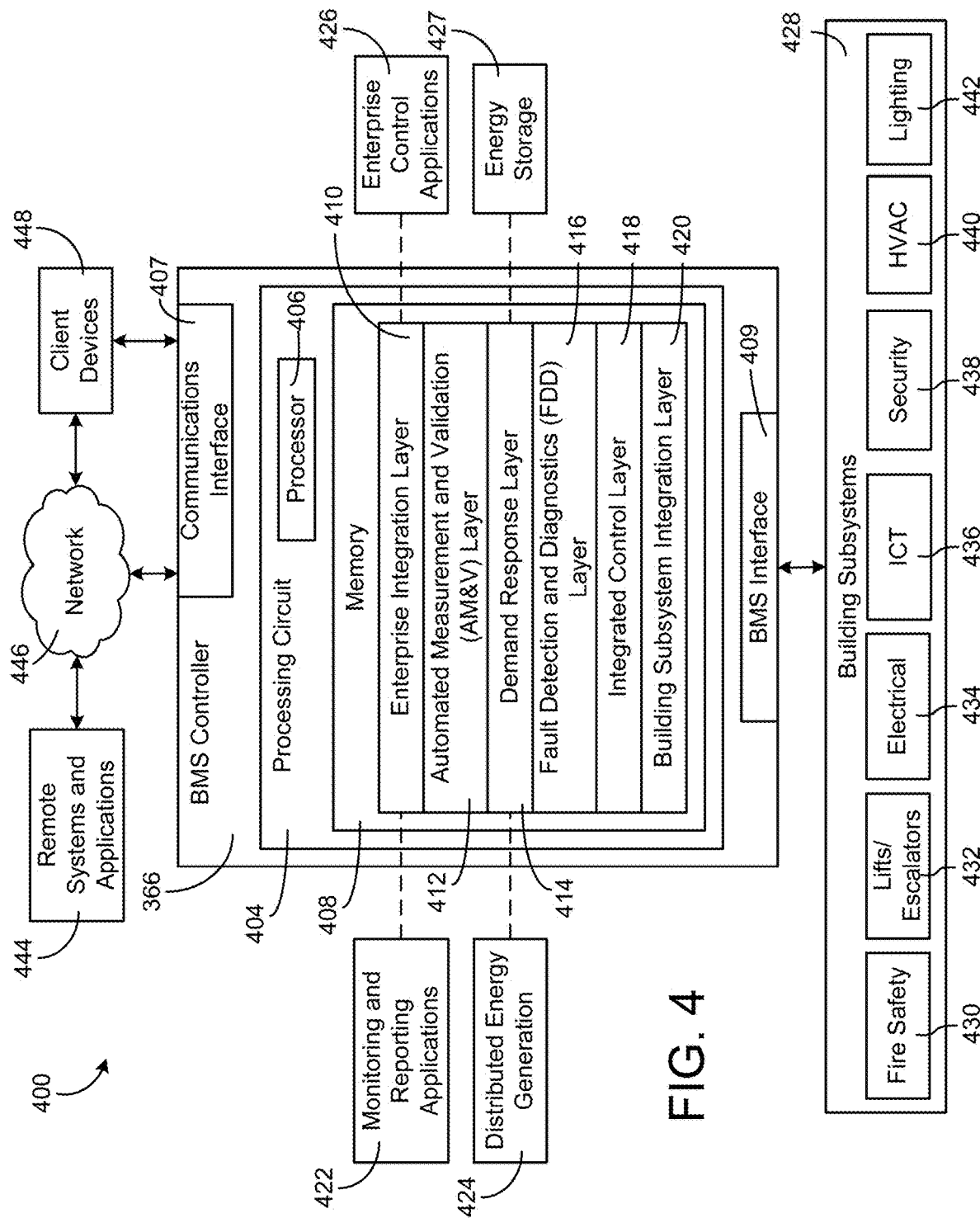
FIG. 4 is a block diagram of a building management system, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In some embodiments, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine control actions for building subsystems 428 based on the inputs, generate control signals based on the determined control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which reduce energy costs based on one or more inputs representative of or based on demand (e.g., price, a curtailment signal, a demand level, etc.). In some embodiments, demand response layer 414 uses equipment models to determine a set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
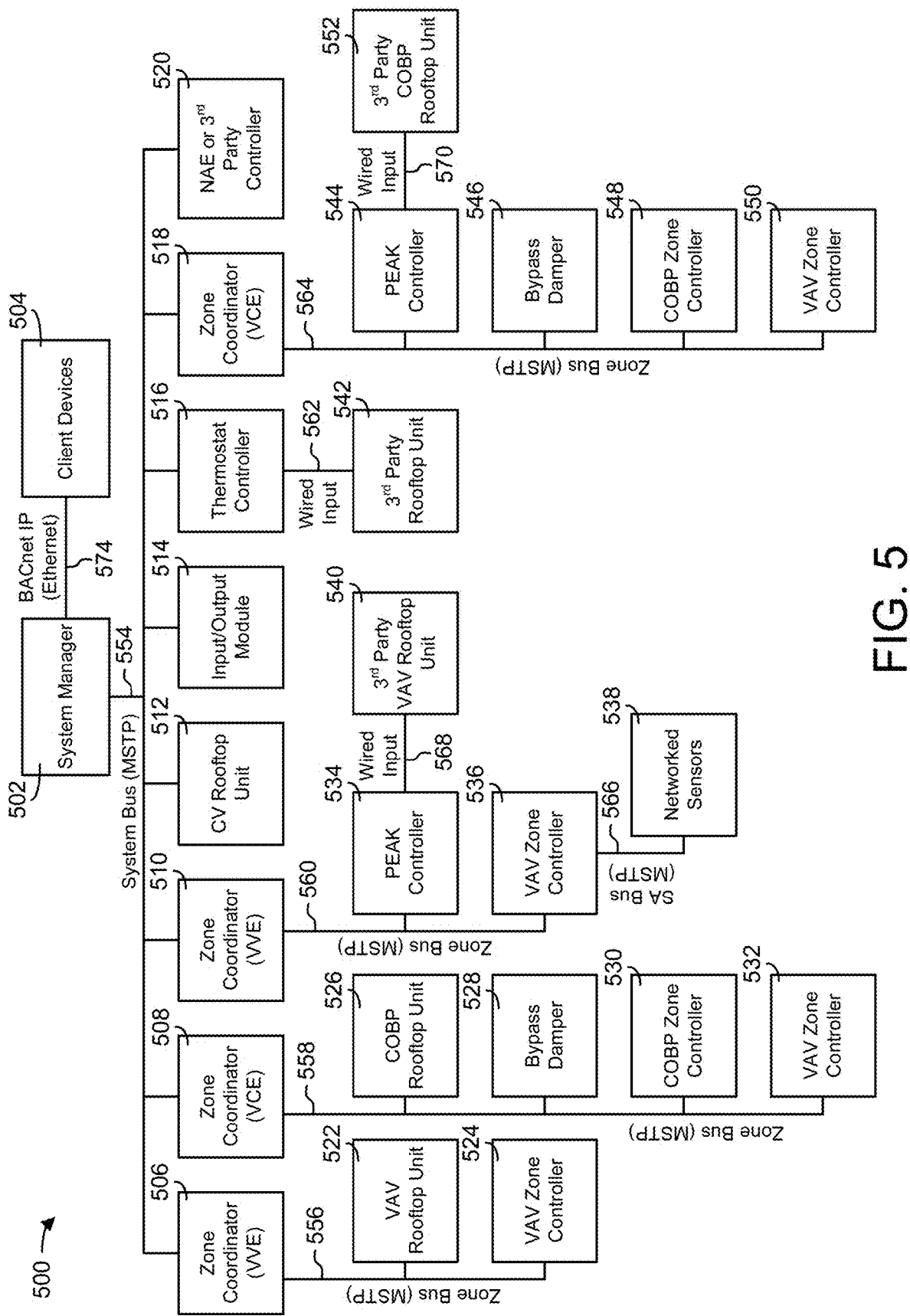
FIG. 5 is a block diagram of a smart building environment, according to some embodiments.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Recommendation Ranking System

Figure 6:
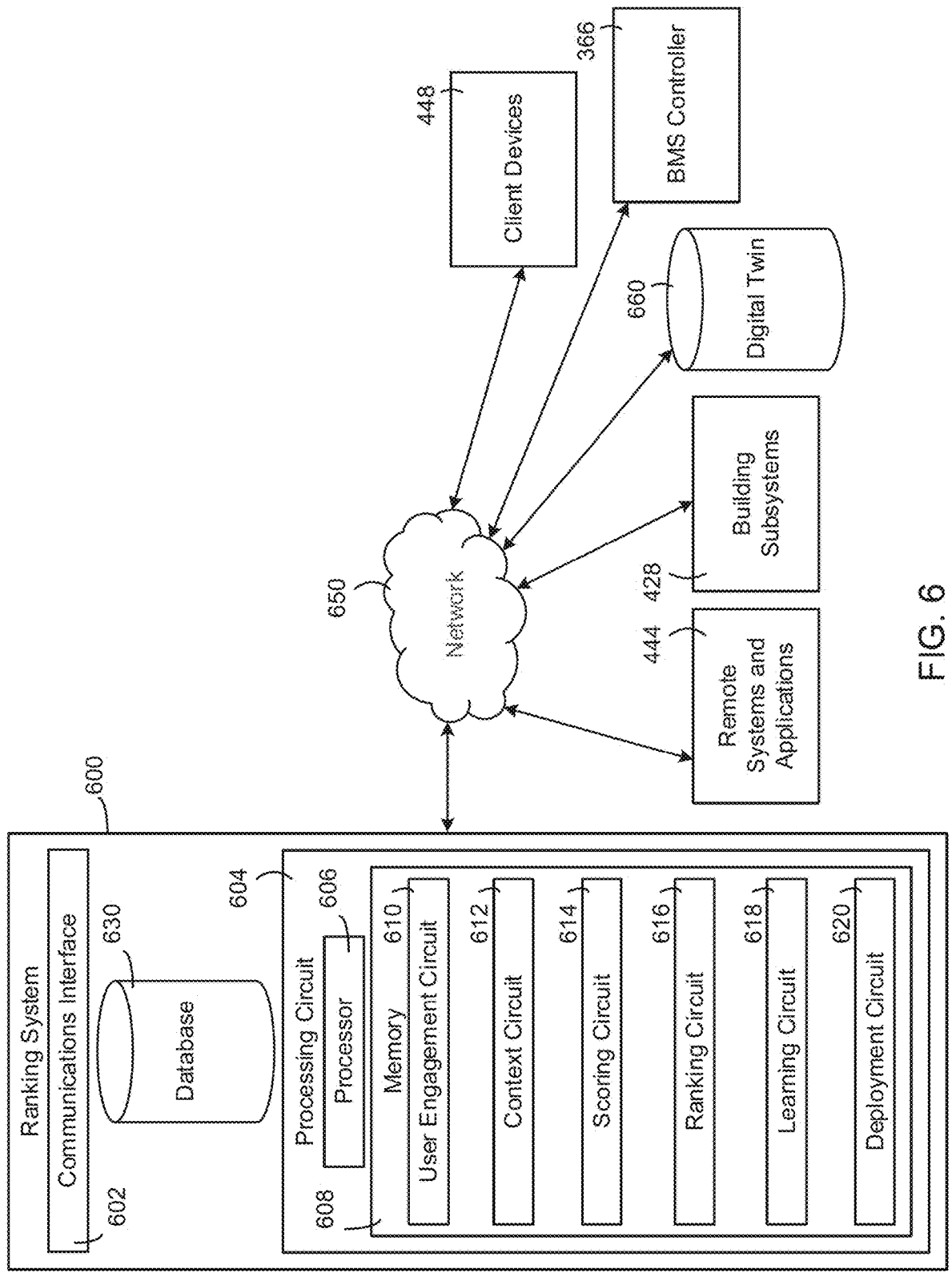
FIG. 6 is a block diagram of a ranking system for ranking recommendations generated by a BMS, according to some embodiments.

Referring now to FIG. 6, ranking system 600 is shown, according to an exemplary embodiment. In various embodiments, ranking system 600 ranks elements such as recommendations generated by a building management system (e.g., BMS 400, BMS 500, etc.). For example, ranking system 600 may rank recommendations associated with employee productivity such as a recommendation to increase the temperature in a room to improve employee comfort based on (i) feedback from employees that they are too cold and (ii) a correlated decrease in productivity associated with employees in the room. As another example, ranking system 600 may rank recommendations associated with space utilization such as a recommendation to move an employee's desk from a first room to a second room based on (i) the second room being closer the employee's most commonly emailed colleagues and (ii) the second room being closer to a conference room that the employee visits daily. As another example, ranking system 600 may rank employee productivity recommendations such as those discussed in U.S. patent application Ser. No. 16/746,316 filed on Jan. 17, 2020, the entire disclosure of which is incorporated by reference herein. As another example, ranking system 600 may rank recommendations associated with faults. For example, a building management system (BMS) may detect a faulty sensor in an AHU and may generate a fault associated with the AHU, and ranking system 600 may rank a recommendation associated with fixing the fault generated by the BMS. In some embodiments, recommendations are associated with faults that have occurred. Additionally or alternatively, ranking system 600 may rank recommendations associated with predicted faults (e.g., faults that have yet to occur but are predicted to occur, etc.). In various embodiments, ranking system 600 ranks recommendations based on various factors. For example, ranking system 600 may execute an importance, tractability, neglectedness (ITN) framework. As another example, ranking system 600 may rank recommendations based on context information associated with each recommendation.

Ranking system 600 is shown to include communications interface 602, processing circuit 604, and database 630. Communications interface 602 is configured to facilitate communication between ranking system 600 and external systems. For example, communications interface 602 may facilitate communication between ranking system 600 and a client device (e.g., one of client devices 448, etc.) configured to display recommendations to a building operator. In various embodiments, ranking system 600 communicates using network 650. Network 650 may include hardware, software, and/or any combination thereof. In various embodiments, network 650 is one of a WAN, the Internet, a cellular network, and/or the like. In various embodiments, ranking system 600 communicates with BMS controller 366, building subsystems 428, remote systems and applications 444, client devices 448, and/or digital twin 660.

Digital twin 660 is a digital representation of spaces, assets, people, events, and/or anything associated with a building or operation thereof. In various embodiments, digital twin 660 is modeled using a graph data structure. In various embodiments, digital twin 660 includes an active compute process. For example, a digital twin 660 may communicate with other digital twins 660, to sense, predict, and take actions. In various embodiments, digital twin 660 is generated dynamically. For example, a digital twin 660 corresponding to a conference room may update its status by looking at occupancy sensors or an electronic calendar (e.g., to turn its status "available" if there is no show, etc.). In various embodiments, digital twin 660 includes context information. Context information may include real-time data and a historical record of each system in the environment (e.g., campus, building, facility, space, etc.). In various embodiments, context information facilitates flexible data modeling for advanced analytics and AI application in scenarios that model highly interconnected entities. In some embodiments, as used herein, a "digital twin" may refer to a digital representation of a single object or entity, such as a sensor or other piece of building equipment, space, person, or event. In some embodiments, "digital twin" may additionally or alternatively refer to a digital representation of a group of objects or entities; for example, a "digital twin" of a building may include digital representations of multiple objects or entities contained within or otherwise associated with the building, such as building equipment of the building, people associated with the building, spaces within the building, events occurring within or in association with the building, etc.

Database 630 is configured to store information associated with ranking system 600. Database 630 may be internal storage or external storage. For example, database 630 may be internal storage with relation to ranking system 600, and/or may include a remote database, cloud-based data hosting, or other remote data storage.

Processing circuit 604 includes processor 606 and memory 608. Ranking system 600 may include one or more processing circuits 604 including one or more processors 606 and memory 608. Each of the processors 606 can be a general purpose or specific purpose processor, an application specific integrated circuit (ASIC), one or more field programmable gate arrays (FPGAs), a group of processing components, or other suitable processing components. Each of the processors 606 is configured to execute computer code or instructions stored in memory 608 or received from other computer readable media (e.g., CDROM, network storage, a remote server, etc.).

Memory 608 may include one or more devices (e.g., memory units, memory devices, storage devices, or other computer-readable medium) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor(s) 606 via processing circuit 604 and may include computer code for executing (e.g., by processor 606) one or more processes described herein.

Memory 608 is shown to include user engagement circuit 610, context circuit 612, scoring circuit 614, ranking circuit 616, learning circuit 618, and deployment circuit 620. User engagement circuit 610 is configured to measure user engagement with a recommendation. For example, user engagement circuit 610 may measure how often a user views and/or interacts with (e.g., clicks on, inquires about, etc.) a recommendation. In various embodiments, user engagement circuit 610 measures individual user engagement. Additionally or alternatively, user engagement circuit 610 may measure aggregate user engagement. For example, user engagement circuit 610 may measure how often a general pool of users interacts with a particular recommendation type. In some embodiments, user engagement circuit 610 measures characteristics associated with a user interaction with recommendations. For example, user engagement circuit 610 may measure a length of time a user's cursor hovered over a recommendation. In various embodiments, user engagement circuit 610 may share user engagement information with other systems (e.g., scoring circuit 614, ranking circuit 616, etc.). For example, user engagement circuit 610 may share a measure of how often a user interacts with a particular type of recommendation and ranking circuit 616 may rank that particular type of recommendation higher in the future in response to determining that the particular type of recommendation has high user engagement.

Context circuit 612 is configured to generate context data associated with a recommendation. For example, context circuit 612 may retrieve context data associated with a recommendation to change a room temperature such as retrieving user feedback regarding the temperature from employees stationed in the room (e.g., from digital twin 660, etc.) or time-series data describing employee productivity and/or efficiency associated with employees stationed in the room. As another example, context circuit 612 may retrieve context data associated with a recommendation to redistribute employees in a space such as an airflow associated with the space, a percentage of full occupancy associated with the space, a health score associated with the space (e.g., describing a pathogen transmissibility rate, etc.), and/or estimated energy costs associated with heating a different space associated with displaced employees. In various embodiments, context circuit 612 tailors context data to the type of element being ranked. For example, for recommendations associated with employee productivity, context circuit 612 may determine context data such as (i) which recommendations will lead to increased occupant productivity (e.g., and what amount of increase, etc.), (ii) which recommendations are time sensitive and/or which recommendations a user has previously overlooked, (iii) which recommendations have the most impact on occupant productivity, (iv) which recommendations have an associated monetization amount (e.g., and the monetization amount itself such as a dollar value, etc.), (v) which recommendations are associated with very important people (VIPs), (vi) which recommendations are associated with mission critical spaces and/or equipment, (vii) which recommendations are associated with certifications such as maintaining an environmental certification, (viii) air quality data associated with a space associated with the recommendation, and/or (ix) which recommendations are associated with equipment having standby (e.g., backups, etc.). As another example, for recommendations associated with space utilization, context circuit 612 may determine context data such as (i) which recommendations will lead to increased space utilization, (ii) which recommendations are time sensitive and/or which recommendations a user has previously overlooked, (iii) which recommendations align multiple user preferences (e.g., multiple users preferring a particular indoor temperature can be grouped, etc.), (iv) which recommendations group users of similar work teams (e.g., multiple users working on a project together can be grouped, etc.), and/or (v) which recommendations are associated with particularly important spaces. In various embodiments, ranking system 600 may rank recommendations associated with various entities such as spaces, people, events (e.g., meetings, calendar events, etc.), building parameters, and/or the like and context circuit 612 may retrieve context data associated with the entities. For example, a first recommendation may be associated with a first AHU and context circuit 612 may retrieve context data associated with the first AHU such as how many people are in spaces served by the first AHU and/or if the first AHU has a functional backup.

Scoring circuit 614 is configured to score recommendations based on various factors. For example, scoring circuit 614 may score a recommendation based on context data received from context circuit 612. In various embodiments, scoring circuit 614 implements one or more scoring algorithms and/or functions to score recommendations. For example, scoring circuit 614 may generate a score for a recommendation associated with space utilization according to the function:

$$\text{Score} = \Sigma(W_{IP}*\text{IP}) + (W_{NR}*\text{NR}) + (W_{RI}*\text{RI})$$

where $W_{IP}$ is a weight associated with the space utilization improvement potential associated with the recommendation, IP is a space utilization improvement potential associated with the recommendation, $W_{NR}$ is a weight associated with the number of recommendations for the particular space, NR is a number of recommendations for the particular space, $W_{RI}$ is a weight associated with the user's interest in recommendations of a similar type (where user interest may include an individual user interest or aggregate user interest), and RI is a measure of the user's interest in the recommendation. As another example, scoring circuit 614 may generate a score for a recommendation associated with employee productivity according to the function:

$$\text{Score} = \Sigma(W_{FP}*\text{FP}) + (W_{OS}*\text{OS}) + (W_{PI}*\text{PI})$$

where $W_{FP}$ is a weight associated with the fault priority of a fault associated with equipment associated with the recommendation, FP is a fault priority of a fault associated with equipment associated with the recommendation, $W_{OS}$ is a weight associated with the work order status associated with a work order associated with the recommendation, OS is a work order status associated with a work order associated with the recommendation, $W_{PI}$ is a weight associated with the priority index associated with equipment associated with the recommendation, and PI is a priority index associated with equipment (or other entities such as spaces, people, etc.) associated with the recommendation. In various embodiments, the one or more scoring algorithms and/or functions are tailored to the type of recommendation. In various embodiments, users may tag entities (e.g., spaces, people, assets, equipment, etc.) as mission critical and ranking system 600 may identify the mission critical tag as part of retrieving context data and may change a score associated with a recommendation associated with the tagged entity (e.g., by increasing the score, etc.) based on the tag.

In various embodiments, scoring circuit 614 uses various parameters to determine a score associated with each recommendation. For example, scoring circuit 614 may use a fault priority associated with an entity such as a piece of equipment associated with a recommendation to determine a score associated with the recommendation. In various embodiments, parameter values are determined using context data. For example, a fault priority value may be determined using context data describing whether a piece of equipment has a backup. In various embodiments, parameter values are associated with a time and/or a time range. For example, a first fault priority weight may be associated with a first time period (e.g., 1-week lookback, etc.) and a second fault priority weight may be associated with a second time period (e.g., a 1-month lookback, etc.). In various embodiments, fault priority refers to an importance associated with a fault associated with an entity such as a piece of equipment. For example, fault priorities may be valued as: critical fault=4, high fault=3, medium fault=2, and low fault=1. In various embodiments, work order status refers to a degree of completion associated with a work order. For example, work order statuses may be valued as: work order not raised=3, work order closed=2, work order open or work order in progress=1. In various embodiments, scoring circuit 614 assigns the greatest value to work orders that have not been raised. In various embodiments, scoring circuit 614 determines a score describing an impact associated with a recommendation. For example, scoring circuit 614 may assign a recommendation having high impact (e.g., solving an important problem such as a critical HVAC failure, etc.) a first score on a first side of a continuum of scores and may assign a recommendation having a low impact (e.g., solving an unimportant problem such as a leaky roof in a building slated for demolition, etc.) a second score on a second side of the continuum. In some embodiments, scoring circuit 614 determines a score based on a tag indicating mission criticality. For example, users may tag faults of a certain kind as mission critical faults. As an additional example, users may tag faults associated with a particular space that a VIP resides in as mission critical and scoring circuit 614 may generate a score for recommendations associated with the particular space to account for the VIP (e.g., by scoring them higher, etc.). In various embodiments, priority index refers to an importance associated with a piece of equipment. A non-limiting example of priority index values are shown in the table below.

| Equipment Category | Impact Area | Equipment Priority Index |
|---|---|---|
| Active Chilled Beam | Single Zone | 5 |
| Air Handling Unit | Multiple Zones | 30 |
| Boiler | Whole Building | 50 |
| Boiler Water Pumps | Whole Building | 50 |
| Chilled Water Pumps | Whole Building | 50 |
| Chiller | Whole Building | 50 |
| COGEN | Whole Building | 100 |
| COGEN Water Pump | Whole Building | 50 |
| Condenser Water Pumps | Whole Building | 50 |
| Constant Air Volume(CAV) | Single Zone | 5 |
| Cooling Tower | Whole Building | 50 |
| CRAC Unit | Single Zone | 5 |
| Dehumidifier | Single Zone | 5 |
| Elevator | Whole Building | 50 |
| Energy Recovery Unit | Multiple Zones | 30 |
| Evaporator Cooler | Multiple Zones | 30 |
| Exhaust Fans | Multiple Zones | 20 |
| Fan Coil Unit | Single Zone | 5 |
| Generator | Whole Building | 100 |
| Generic Pump | Multiple Zones | 20 |
| Generic Valve | Single Zone | 5 |
| GTW | Single Zone | 5 |
| Heat Exchanger | Whole Building | 50 |
| Heat Pump | Multiple Zones | 20 |
| Hot Water Pumps | Whole Building | 50 |
| Isolation Damper | Single Zone | 5 |
| Isolation Room | Single Zone | 5 |
| Lighting Control System | Single Zone | 5 |
| Medical Gas Monitoring | Single Zone | 5 |
| Meter | Multiple Zones | 20 |
| Package Unit | Single Zone | 5 |
| Power Distribution Unit | Multiple Zones | 20 |
| Power Windows | Single Zone | 5 |
| Pressure Monitor | Single Zone | 5 |
| Radiant Cooling | Single Zone | 5 |
| Radiant Heating | Single Zone | 5 |
| Reheat Coil | Single Zone | 5 |
| Relief Air Fans | Single Zone | 5 |
| Roof Top Unit | Multiple Zones | 30 |
| Sewage Treatment Pump | Multiple Zones | 20 |
| Staircase Pressurization Fans | Whole Building | 100 |
| Supply Fans | Multiple Zones | 20 |
| Traffic Signal Controller | Single Zone | 5 |
| Unit Heater | Single Zone | 5 |
| Unit Ventilator | Single Zone | 5 |
| UPS | Whole Building | 100 |
| Variable Air Volume(VAV) | Single Zone | 5 |
| Variable Frequency Drive | Multiple Zones | 30 |

-continued

| Equipment Category | Impact Area | Equipment Priority Index |
|---|---|---|
| Variable Refrigerant Flow | Multiple Zones | 30 |
| Water Treatment Plant | Whole Building | 100 |
| Water Treatment Pump | Whole Building | 50 |
| Zone Control | Single Zone | 5 |

In some embodiments, priority index values are determined based on an impact associated with the event as shown in the table below.

| Impact | Equipment priority Index |
|---|---|
| Whole Building (No Standby Option) | 100 |
| Whole Building (Standby Option) | 50 |
| Multiple Zones (No Standby Option) | 30 |
| Multiple Zones ( Standby Option) | 20 |
| Single Zone | 5 |

Additionally or alternatively, priority index values may be dynamically determined based on context data. For example, priority index values may be determined using the ranges specified in the table below.

| | Starting Value | Max Value (Dynamic based on factors such as user interest) |
|---|---|---|
| For whole building with standby option | 50 | 75 |
| For multiple zone with standby option | 20 | 28 |
| For single zone | 5 | 10 |

In various embodiments, scoring circuit 614 assigns higher scores to recommendations that receive more user interest (e.g., clicks, etc.). For example, scoring circuit 614 may increase a priority index value associated with a recommendation from 50 to 71 in response to determining that the user has shown a high degree of interest in previous recommendations of a similar type as the recommendation. In various embodiments, similarity between recommendations is determined based on an entity (e.g., space, equipment, personnel, etc.) included in the recommendation. For example, recommendations relating to a particular space may be determined to be of a similar type. Additionally or alternatively, recommendations relating to particular actions (e.g., replace an AHU blower, etc.) may be determined to be of a similar type. In some embodiments, ranking system 600 stores a list of recommendations determined to be of a similar type and ranking system 600 may access the list to determine whether two recommendations are of a similar type based on respective characteristics. In some embodiments, ranking system 600 includes one or more rules to determine similarity. For example, ranking system 600 may include a number of rules that specify whether recommendations are considered similar based on analysis of the recommendation parameters. In some embodiments, user interest is determined for various periods of time. For example, user engagement circuit 606 may weight user clicks that occurred in the last 5 days higher than user clicks that occurred a year ago. In various embodiments, scoring circuit 614 iteratively updates scores based on how interested users were in previous recommendations. For example, scoring circuit 614 may decrease a score associated with a first type of recommendation from 88 to 77 in response to determining that the user previously was not very engaged with recommendations of the first type. In various embodiments, scoring circuit 614 becomes more accurate to a user's preferences over time. In various embodiments, scoring circuit 614 generates user specific scores (e.g., specific to a particular user's level of engagement, etc.). Additionally or alternatively, scoring circuit 614 may generate general scores (e.g., based on aggregate user interest, etc.). In various embodiments, ranking system 600 facilitates selecting a time range and scoring circuit 614 may update scores associated with recommendations based on the selected time range. Recommendations may be associated with one or more events such as equipment faults, work order events, user interactions, and/or the like. In various embodiments, scoring circuit 614 combines one or more events associated with a recommendation and scores the combination. Additionally or alternatively, scoring circuit 614 may score each event separately and combine the combination of scores. As a non-limiting example, a first recommendation for "Fix AHU #1" may include faults "damper #3 of AHU #1 faulty" and "service feed A2 of AHU #1 needs replacement" and scoring circuit 614 may retrieve context information with both faults, score both faults based on the context information, and combine both scores to generate an aggregate score for the first recommendation. In some embodiments, one or more recommendations may be associated with a single underlying problem. Ranking system 600 may identifying the underlying problem and combine recommendations that are associated with the underlying problem to reduce operator notification fatigue. For example, multiple recommendations may be associated with a faulty control relay and ranking system 600 may identify the recommendations and combine them into a single recommendation.

Ranking circuit 616 is configured to rank recommendations based on scores associated with each recommendation. For example, ranking circuit 616 may rank recommendations in ascending order based on score (e.g., the score determined by scoring circuit 614, etc.). Additionally or alternatively, ranking circuit 616 may rank recommendations in descending order based on score. In various embodiments, ranking circuit 616 modifies how recommendations are ranked based on the type of recommendation. For example, recommendations associated with space utilization may be ranked as shown in the table below.

| Space utilization Weightage | Space utilization improvement potential 45% | Number of recommendations for that space 45% | Interest in the recommendation 10% | Total Score | Rank |
|---|---|---|---|---|---|
| 15% | 85 | 6 | 24 | 43.35 | 1 |
| 9% | 91 | 1 | 14 | 42.8 | 2 |
| 27% | 63 | 4 | 34 | 33.55 | 3 |
| 53% | 47 | 10 | 18 | 27.45 | 4 |
| 65% | 35 | 20 | 13 | 26.05 | 5 |

In various embodiments, space utilization is calculated as: space utilization=occupancy/capacity. Likewise, space utilization potential may be calculated as: space utilization potential=1-space utilization. As another example, recommendations associated with occupant productivity may be ranked as shown in the table below.

| Weightage | Fault priority 20% | Work order status 30% | Equipment priority index 50% | Total Score | Rank |
|---|---|---|---|---|---|
| | 4 | 3 | 50 | 26.7 | 1 |
| | 4 | 3 | 100 | 51.7 | 2 |
| | 3 | 3 | 80 | 41.5 | 3 |
| | 4 | 3 | 80 | 41.7 | 4 |

In various embodiments, ranking circuit 616 sends ranking information to deployment circuit 620. For example, ranking circuit 616 may rank recommendations and transmit the ranking information to deployment circuit 620 which may prioritize the recommendations (e.g., by modifying a user interface to emphasize top ranking recommendations, by modifying a process queue of a server, by modifying a work order queue of a service team, etc.).

Learning circuit 618 is configured to update ranking system 600 over time to improve ranking results such that the most impactful recommendations and/or the recommendations that a user finds most useful are ranked highest. For example, learning circuit 618 may monitor user engagement (e.g., via user engagement circuit 610, etc.) with ranked recommendations to determine whether the user found the top ranked recommends the most useful (e.g., as measured by user clicks/engagement, etc.). As a further example, learning circuit 618 may update scoring circuit 614 to rank recommendations of a first type higher than recommendations of a second type in response to determining that recommendations of the first type receive greater user engagement than recommendations of the second type despite being ranked lower than recommendations of the second type in the past. In some embodiments, recommendations that receive high user engagement (e.g., clicks, views, etc.) are ranked higher, thereby showing the user more of what they want to see. Additionally or alternatively, recommendations that receive low user engagement may be ranked higher, thereby showing the user recommendations that they may have overlooked. In various embodiments, learning circuit 618 implements a machine learning and/or artificial intelligence system. For example, learning circuit 618 may implement smart workspace recommendations as discussed in U.S. Provisional Patent Application No. 63/136,089 filed on Jan. 11, 2021, the entire disclosure of which is incorporated by reference herein.

Deployment circuit 620 is configured to take one or more actions based on ranking information received from ranking circuit 616. For example, deployment circuit 620 may generate and/or update a user interface displaying recommendations to a user to emphasize recommendations having a high ranking (e.g., where a high ranking is a low number or vice versa, etc.) such as by displaying the recommendations higher in an ordered list. As another example, deployment circuit 620 may update a work order queue to prioritize work orders associated with high ranking recommendations. As yet another example, deployment circuit 620 may update a smart agent work queue to prioritize actions associated with high ranking recommendations such as updating a digital twin of a building to reflect an added thermostat. In various embodiments, deployment circuit 620 emphasizes high ranking recommendations for a user. For example, deployment circuit 620 may generate a user interface displaying recommendations in ascending and/or descending order of rank, thereby facilitating user prioritizing. Updating user interfaces is discussed in detail below with reference to FIGS. 8 and 9.

Figure 7:
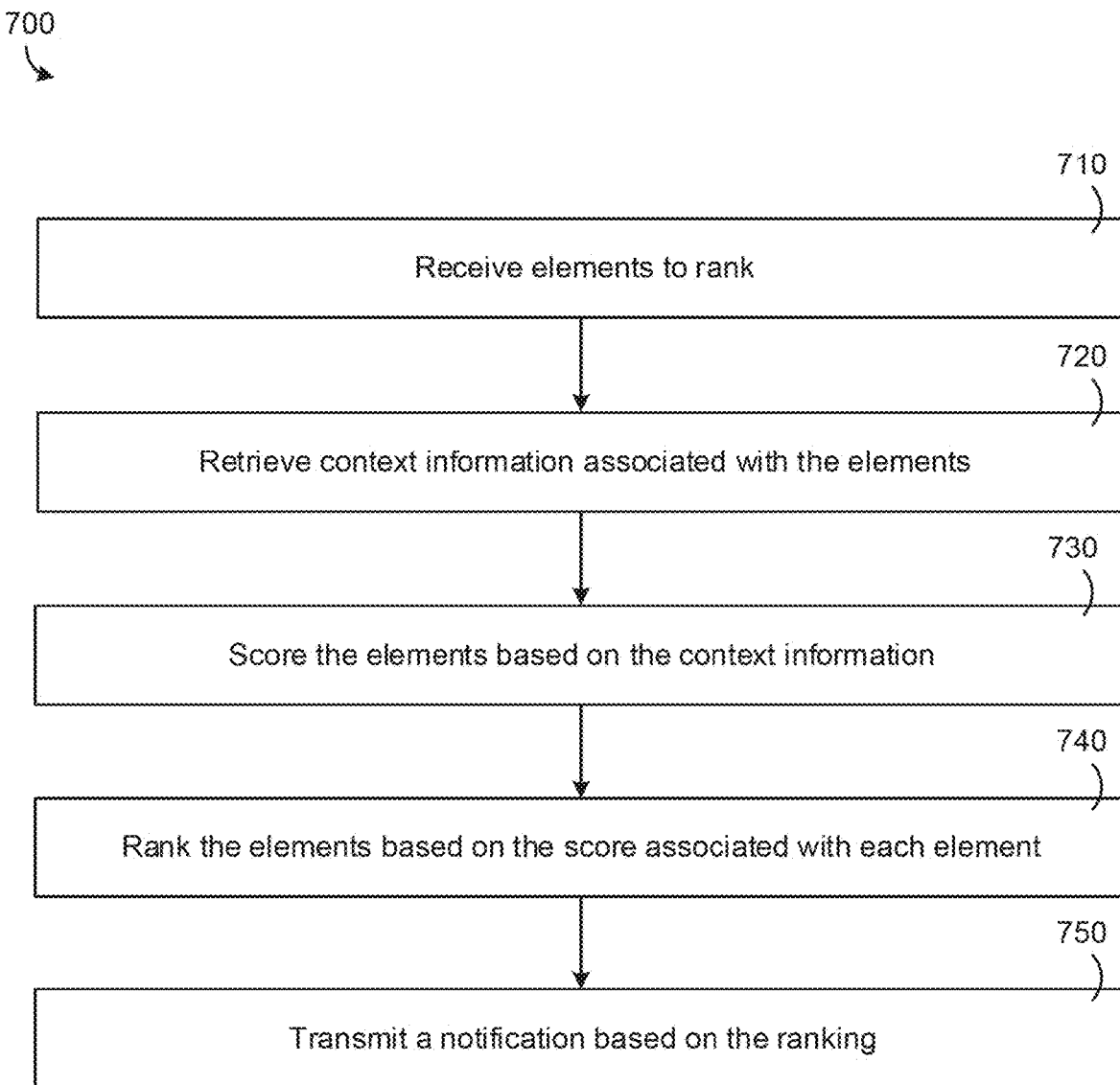
FIG. 7 is a flowchart illustrating a method of ranking elements using the ranking system of FIG. 6, according to some embodiments.

Referring now to FIG. 7, method 700 for ranking elements is shown, according to an exemplary embodiment. In various embodiments, ranking system 600 performs method 700. For example, ranking system 600 may rank elements such as BMS generated recommendations, equipment fault notifications, security notifications, calendar alerts, health reminders, task reminders, and/or the like. At step 710, ranking system 600 may receive elements to rank. In various embodiments, the elements include recommendations generated by a BMS. For example, the elements may include employee productivity recommendations such as a recommendation to increase the temperature in a space to improve employee comfort and productivity. In various embodiments, the elements are associated with events, spaces, people, and/or assets (e.g., monetary assets, fungible goods, equipment, etc.). For example, a recommendation to fix a piece of HVAC equipment may be associated with an AHU. As another example, a recommendation to change a location of an employee's desk may be associated with a particular employee.

At step 720, ranking system 600 may retrieve context information associated with one or more of the elements. For example, ranking system 600 may retrieve context information associated with the events, spaces, and/or assets associated with a recommendation. As another example, ranking system 600 may retrieve user engagement data associated with recommendations of a similar type as the recommendation to be ranked. The context data may include information such as a fault priority, a work order status, an equipment priority index, a space utilization improvement potential, a number of similar recommendations, user engagement measurements, a number of affected individuals associated with an equipment fault, a tag indicating mission criticality, health data, air quality data, certification information (e.g., environmental sustainability certifications such as LEED green certifications, health certifications, air quality certifications, etc.), and/or the like. In various embodiments, the context data is tailored to the element being ranked. For example, the context information associated with ranking calendar alerts may include a number of individuals associated with the calendar alert, a title/importance of the individuals associated with the calendar alert, the productivity associated with an event associated with the calendar alert, a distance to a location of an event associated with the calendar alert, other overlapping events, and/or the like. For the sake of brevity, all possible combinations of context information associated with various elements that may be ranked by ranking system 600 are not listed herein, however one of skill in the art will appreciate that context information will vary based on the elements to be ranked.

At step 730, ranking system 600 may score the elements based on the context information. For example, ranking system 600 may assign a score to a recommendation associated with a fixing a piece of HVAC equipment by computing a score as discussed above in relation to FIG. 6. At step 740, ranking system 600 may rank the elements based on the score associated with each element. In various embodiments, ranking system 600 ranks the elements in ascending order (e.g., based on score, etc.) Additionally or alternatively, ranking system 600 may rank the elements in descending order. In some embodiments, ranking system 600 ranks the elements in a different manner. For example, ranking system 600 may separately rank each type of element (e.g., recommendations associated with a particular type of equipment fault, etc.) to produce a number of ascending lists for each type of element.

At step 750, ranking system 600 may transmit a notification based on the ranking. In various embodiments, step 750 includes generating, updating, and/or displaying a user interface including the ranked elements. For example, ranking system 600 may display a user interface having the top ranked recommendations shown at the top of a list and the bottom ranked recommendations shown at the bottom of the list. Additionally or alternatively, step 750 may include performing other actions such as modifying a work order queue. In various embodiments, step 750 includes transmitting the notification to an external system such as a BMS. For example, ranking system 600 may transmit an indication of the ranked elements to a BMS that may execute a machine learning model to select one or more of the ranked elements for display to a user.

Referring now to FIG. 8, indoor health interface 800 is shown, according to an exemplary embodiment. In various embodiments, ranking system 600 may generate (or facilitate generation of) indoor health interface 800. Indoor health interface 800 may display a number of recommendations 804 to a user. In various embodiments, a user may select time period 802 to update which recommendations 804 are displayed. In various embodiments, ranking system 600 updates a ranking of recommendations 804 based on time period 802 (e.g., to favor older and/or unaddressed recommendations, etc.). In various embodiments, recommendations 804 are displayed in an order with higher ranked recommendations being displayed at top 806 and lower ranked recommendations be displayed at bottom 808. In various embodiments, ranking system 600 determines where in the order recommendations 804 are displayed based on context information associated with each recommendation.

Figure 9:
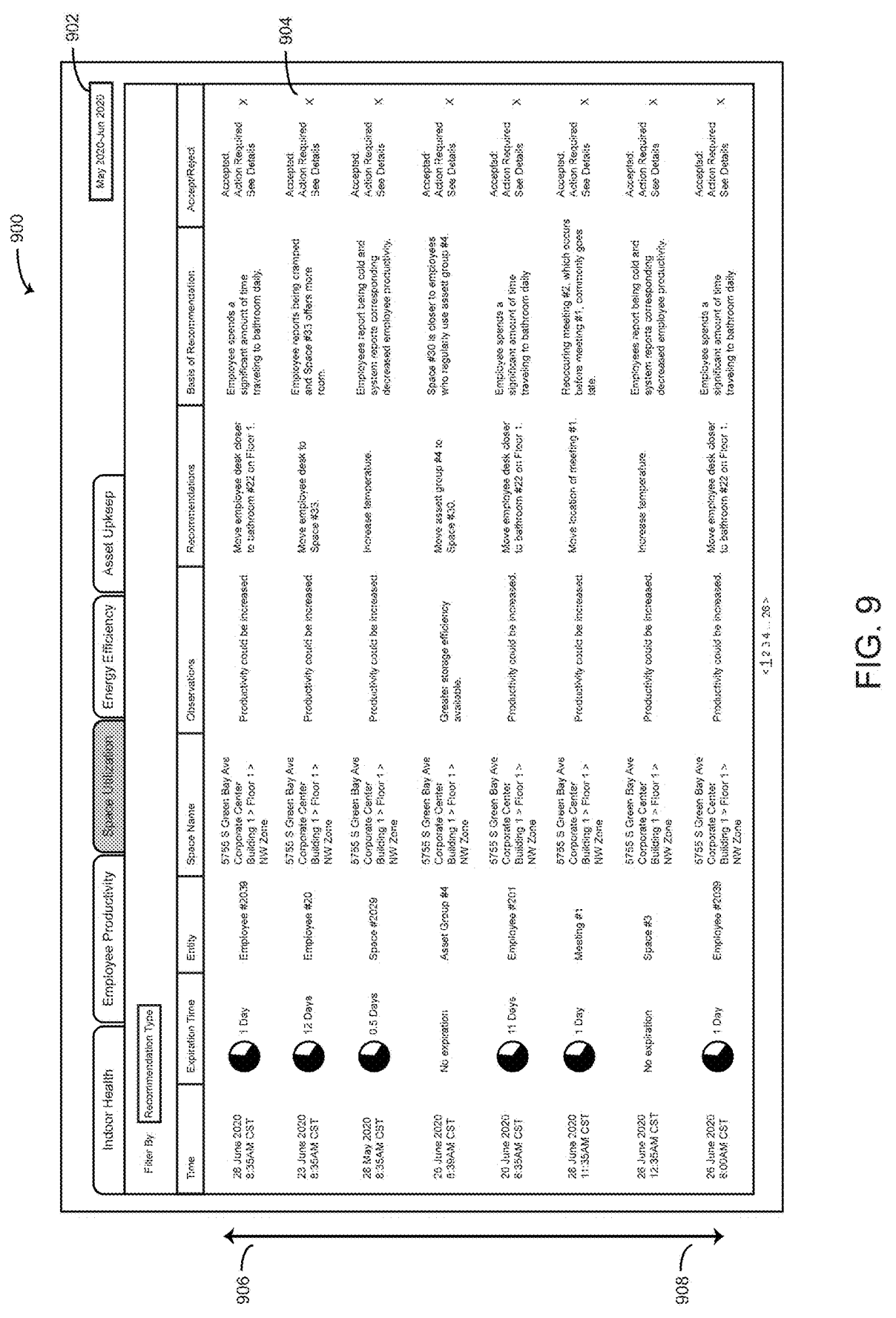

Referring now to FIG. 9, space utilization interface 900 is shown, according to an exemplary embodiment. In various embodiments, ranking system 600 may generate (or facilitate generation of) space utilization interface 900. Space utilization interface 900 may display a number of recommendations 904 to a user. In various embodiments, a user may select time period 902 to update which recommendations 904 are displayed. In various embodiments, ranking system 600 updates a ranking of recommendations 904 based on time period 902 (e.g., to favor older and/or unaddressed recommendations, etc.). In various embodiments, recommendations 904 are displayed in an order with higher ranked recommendations being displayed at top 906 and lower ranked recommendations be displayed at bottom 908. In various embodiments, ranking system 600 determines where in the order recommendations 904 are displayed based on context information associated with each recommendation.

Configuration of Exemplary Embodiments

It should be appreciated that the systems and methods disclosed herein can be used to control any building equipment system that affects a condition of a building or space, such as, but not limited to, an HVAC system, waterside system, airside system, electrical system, or any other building equipment system. The illustrations and descriptions herein describe embodiments configured to control of an HVAC system, but these and other embodiments can be extended to control any one of the other building equipment systems.

It should also be appreciated that the systems and methods disclosed herein can utilize any machine learning control algorithm. RL and DRL models provide a framework for state-driven control using training data, but other models can be used to control the building equipment, such as, but not limited to, genetic algorithm control, neural network control, artificial intelligence, and other machine learning control.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of ranking recommendations, the method comprising:
   receiving, by one or more processing circuits, a recommendation to improve employee productivity, the recommendation including a first indication of an equipment fault;
   retrieving, by the one or more processing circuits, context data associated with the equipment fault, the context data including at least three of: a fault priority associated with the equipment fault, a work order status for a work order associated with the equipment fault, a priority associated with at least one of (i) a piece of equipment, (ii) a space, or (iii) an individual associated with the equipment fault, a monetary value associated with the equipment fault, or a health parameter associated with the equipment fault;
   calculating, by the one or more processing circuits, a score for the recommendation based on the at least three of: the fault priority, the work order status, the priority, the monetary value, or the health parameter; and
   modifying, by the one or more processing circuits, a work order queue or maintenance schedule based on at least one of the score or the recommendation, wherein the equipment fault is repaired, the piece of equipment associated with the equipment fault is repaired or replaced, or the piece of equipment associated with the equipment fault or other equipment is controlled to work around the equipment fault based on the work order queue or maintenance schedule.

2. The method of claim 1, wherein retrieving the context data includes retrieving data associated with a number of previous user interactions with recommendations relating to equipment of a same type as the piece of equipment.

3. The method of claim 2, further comprising updating, by the one or more processing circuits, the priority based on the number of previous user interactions.

4. The method of claim 1, wherein the context data further includes at least one of: an air quality metric associated with the equipment fault, or an energy usage metric associated with the equipment fault, and wherein the calculation of the score is further based on at least one of: the air quality metric or the energy usage metric.

5. The method of claim 1, wherein the priority is a user defined priority corresponding to the at least one of: the piece of equipment, the space, or the individual.

6. The method of claim 1, wherein retrieving the context data includes retrieving data describing a change to one or more environmental parameters of the space associated with the equipment fault, and wherein the method further includes updating the priority based on the change.

7. The method of claim 1, wherein the score is calculated based on the fault priority, the work order status, and the priority.

8. The method of claim 1, wherein retrieving the context data includes retrieving a second indication of whether the piece of equipment has a standby, and wherein the method further includes updating the priority based on the second indication.

9. The method of claim 1, wherein the equipment fault is a predicted equipment fault that has yet to occur.

10. A system for ranking recommendations, the system comprising one or more processors and one or more memories storing instructions thereon that, when executed by the one or more processors, cause the one or more processors to:
    receive a recommendation to improve employee productivity, the recommendation including a first indication of an equipment fault;
    retrieve context data associated with the equipment fault, the context data including at least three of: a fault priority associated with the equipment fault, a work order status for a work order associated with the equipment fault, a priority associated with at least one of (i) a piece of equipment, (ii) a space, or (iii) an individual associated with the equipment fault, a monetary value associated with the equipment fault, or a health parameter associated with the equipment fault;
    calculate a score for the recommendation based on the at least three of: the fault priority, the work order status, the priority, the monetary value, or the health parameter; and
    perform an action that affects a condition within the space or the employee productivity or an action that affects operation of the piece of equipment associated with the equipment fault or other equipment operable to work around the equipment fault based on the score using at least one of the score or the recommendation.

11. The system of claim 10, wherein retrieving the context data includes retrieving data associated with a number of previous user interactions with recommendations relating to equipment of a same type as the piece of equipment.

12. The system of claim 11, wherein the instructions further cause the one or more processors to update the priority based on the number of previous user interactions.

13. The system of claim 10, wherein performing the action includes emphasizing the recommendation over other recommendations by displaying the recommendation higher in a list of recommendations based on the score for the recommendation and other scores associated with each of the other recommendations.

14. The system of claim 10, wherein the context data further includes at least one of: an air quality metric associated with the equipment fault, or an energy usage metric associated with the equipment fault, and wherein the calculation of the score is further based on at least one of: the air quality metric, or the energy usage metric.

15. The system of claim 10, wherein the priority is a user defined priority corresponding to the at least one of: the piece of equipment, the space, or the individual.

16. The system of claim 10, wherein retrieving the context data includes retrieving data describing a change to one or more environmental parameters of the space associated with the equipment fault, and wherein the instructions further cause the one or more processors to update the priority based on the change.

17. The system of claim 10, wherein the score is calculated based on the fault priority, the work order status, and the priority.

18. The system of claim 10, wherein retrieving the context data includes retrieving a second indication of whether the piece of equipment has a standby, and wherein the instructions further cause the one or more processors to update the priority based on the second indication.

19. The system of claim 10, wherein the equipment fault is a predicted equipment fault that has yet to occur.

* * * * *